US 6,634,803 B2

(12) United States Patent
Brezina et al.

(10) Patent No.: US 6,634,803 B2
(45) Date of Patent: Oct. 21, 2003

(54) EXTERNAL EMI SHIELD FOR MULTIPLE ARRAY OPTOELECTRONIC DEVICES

(75) Inventors: Johnny R. Brezina, Austin, TX (US); Brian M. Kerrigan, Austin, TX (US); Gerald D. Malagrino, Jr., Rochester, MN (US); James R. Moon, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/006,644

(22) Filed: Nov. 5, 2001

(65) Prior Publication Data
US 2003/0086663 A1 May 8, 2003

(51) Int. Cl.⁷ .................................................. G02B 6/36
(52) U.S. Cl. ............................. 385/92; 385/88; 385/89
(58) Field of Search ............................... 385/88–94, 59, 385/76

(56) References Cited

U.S. PATENT DOCUMENTS

| | | | |
|---|---|---|---|
| 4,198,119 A | 4/1980 | Uberbacher | 385/49 |
| 4,218,113 A | 8/1980 | Uberbacher | 385/49 |
| 4,373,778 A | 2/1983 | Adham | 385/88 |
| 4,458,985 A | 7/1984 | Balliet et al. | 385/72 |
| 4,553,813 A | 11/1985 | McNaughton et al. | 385/52 |
| 4,598,974 A | 7/1986 | Munn et al. | 385/76 |
| 4,934,778 A | 6/1990 | Gillett | 385/76 |
| 5,093,879 A | 3/1992 | Bregman et al. | 385/93 |
| 5,202,943 A | 4/1993 | Carden et al. | 385/92 |
| 5,315,679 A | 5/1994 | Baldwin et al. | 385/76 |
| 5,329,604 A | 7/1994 | Baldwin et al. | 385/92 |
| 5,333,225 A | 7/1994 | Jacobowitz et al. | 385/93 |
| 5,337,388 A | 8/1994 | Jacobowitz et al. | 385/76 |
| 5,396,573 A | 3/1995 | Ecker et al. | 385/88 |
| 5,499,311 A | 3/1996 | DeCusatis | 385/49 |
| 5,729,644 A | 3/1998 | Shiflett et al. | 385/59 |
| 6,062,738 A | 5/2000 | Braquet et al. | 385/59 |
| 6,085,006 A | 7/2000 | Gaio et al. | 385/92 |
| 6,137,694 A | 10/2000 | Kerrigan et al. | 361/818 |
| 6,200,041 B1 | 3/2001 | Gaio et al. | 385/92 |
| 6,201,704 B1 | 3/2001 | Poplawski et al. | 361/753 |
| 6,439,781 B1 * | 8/2002 | Gaio et al. | 385/92 |

OTHER PUBLICATIONS

U.S. patent application entitled "Internal EMI Shield for Multiple Array Optoelectronic Devices", (Inventors Johnny R. Brezina, et al.).

U.S. patent application entitled "Multiple Array Optoelectronic Connector with Integrated Latch", (Inventors Johnny R. Brezina, et al.).

U.S. patent application entitled "Fiber Optic Transceiver, Connector, and Method of Dissipating Heat", (Inventors Johnny R. Brezina, et al.).

* cited by examiner

Primary Examiner—Phan T. H. Palmer
(74) Attorney, Agent, or Firm—Cardinal Law Group; Casimer K. Salys

(57) ABSTRACT

An optical fiber link module comprises upper and lower portions and a shield. One of the upper portion or lower portion has a groove, and one of the upper portion or lower portion has at least one tab extending therefrom. The shield has a detent and at least one cutout, the detent engaging the groove and the at least one cutout cooperating with the at least one tab.

19 Claims, 2 Drawing Sheets

EXTERNAL EMI SHIELD FOR MULTIPLE ARRAY OPTOELECTRONIC DEVICES

RELATED APPLICATIONS

This application claims priority to U.S. patent application Ser. No. 09/956,771 filed on Sep. 20, 2001 entitled "Fiber Optic Transceiver, Connector, And Method of Dissipating Heat" by Johnny R. Brezina, et al., the entire disclosure of which is incorporated by reference, herein.

This application also relates to the following applications, filed concurrently herewith:

"Optical Alignment In A Fiber Optic Transceiver", by Johnny R. Brezina, et al. Ser. No. 10/007,027 filed Nov. 5, 2001;

"Packaging Architecture For A Multiple Array Transceiver Using A Continuous Flexible Circuit", by Johnny R. Brezina, et al. Ser. No. 10/007,026 filed Nov. 5, 2001;

"Flexible Cable Stiffener for An Optical Transceiver", by Johnny R. Brezina, et al. Ser. No. 10/007,024 filed Nov. 5, 2001;

"Enhanced Folded Flexible Cable Packaging for Use in Optical Transceivers, by Johnny R. Brezina, et al. Ser. No. 10/006,836 filed Nov. 5, 2001

"Apparatus and Method for Controlling an Optical Transceiver", by Johnny R. Brezina, et al. Ser. No. 10/007,024 filed Nov. 5, 20001;

"Internal EMI Shield for Multiple Array Optoelectronic Devices", by Johnny R. Brezina, et al. Ser. No. 10/006,834 filed Nov. 5, 2001;

"Multiple Array Optoelectronic Connector with Integrated Latch", by Johnny R. Brezina, et al. Ser. No. 10/007,023 filed Nov. 5, 2001;

"Mounting a Lens Array in a Fiber Optic Transceiver", by Johnny R. Brezina, et al. Ser. No. 10/006,837 filed Nov. 5, 2001;

"Packaging Architecture for a Multiple Array Transceiver Using a Flexible Cable", by Johnny R. Brezina, et al. Ser. No. 10/006,835 filed Nov. 5, 2001;

"Packaging Architecture for a Multiple Array Transceiver Using a Flexible Cable and Stiffener for Customer Attachment", by Johnny R. Brezina, et al. Ser. No. 10/006,838 filed Nov. 5, 2001;

"Packaging Architecture for a Multiple Array Transceiver Using a Winged Flexible Cable for Optimal Wiring", by Johnny R. Brezina, et al. Ser. No. 10/006,839 filed Nov. 5, 2001;

"Horizontal Carrier Assembly for Multiple Array Optoelectronic Devices", by Johnny R. Brezina, et al. Ser. No. 10/007,215 filed Nov. 5, 2001.

TECHNICAL FIELD OF THE INVENTION

This invention is generally related to an external shield for use in optoelectronic ports, and more particularly related to shields that prevent electromagnetic emissions from optical fiber link modules.

BACKGROUND OF THE INVENTION

Optical fiber is widely used to rapidly and reliably transfer data between computer systems. In general, an optical fiber includes a core region that is coated by an annular clad. The core region has an index of refraction greater than that of the clad, so that light is transmitted through the core by total internal refraction. Optical fibers transmit data from an optoelectronic transducer, such as a laser or Light Emitting Diode (LED), to an optoelectronic receiver that generates electrical information based upon the signal received.

Optical transceivers tend to generate electromagnetic interference (EMI) in the range of about 100 megahertz to 5 gigahertz, and this radiation is most likely to escape from the point at which the fiber is connected to the optoelectronic component. The fibers are typically either threaded onto the optoelectronic components or latched by the use of connectors such MTP (Multicast Transport Protocol) or MTO (Multi-Modal Transport Operator) connectors. Because these connectors are typically plastic, however, they are not effective EMI shields. In order to limit EMI, external shielding has therefore been provided in various forms. These shields have an opening that allows the connector to attach to the optoelectronic component. This opening is in effect an electromagnetic hole in the shield that allows EMI to escape.

SUMMARY OF THE INVENTION

The present invention is an optical fiber link module comprising upper and lower portions and a shield. One of the upper portion or lower portion has a groove, and one of the upper portion or lower portion has at least one tab extending therefrom. The shield has a detent and at least one cutout. The detent engages the groove, and the at least one cutout cooperates with the at least one tab.

It is an object of the present invention to provide an optical fiber link module of the type described above that inhibits EMI.

Another object of the present invention is to provide an optical link module of the type described above that permits easy access to the connector and fiber cable by the end user.

Still another object of the present invention is to provide an optical link module of the type described above that is cost effective.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION OF THE INVENTION

Figure 1:
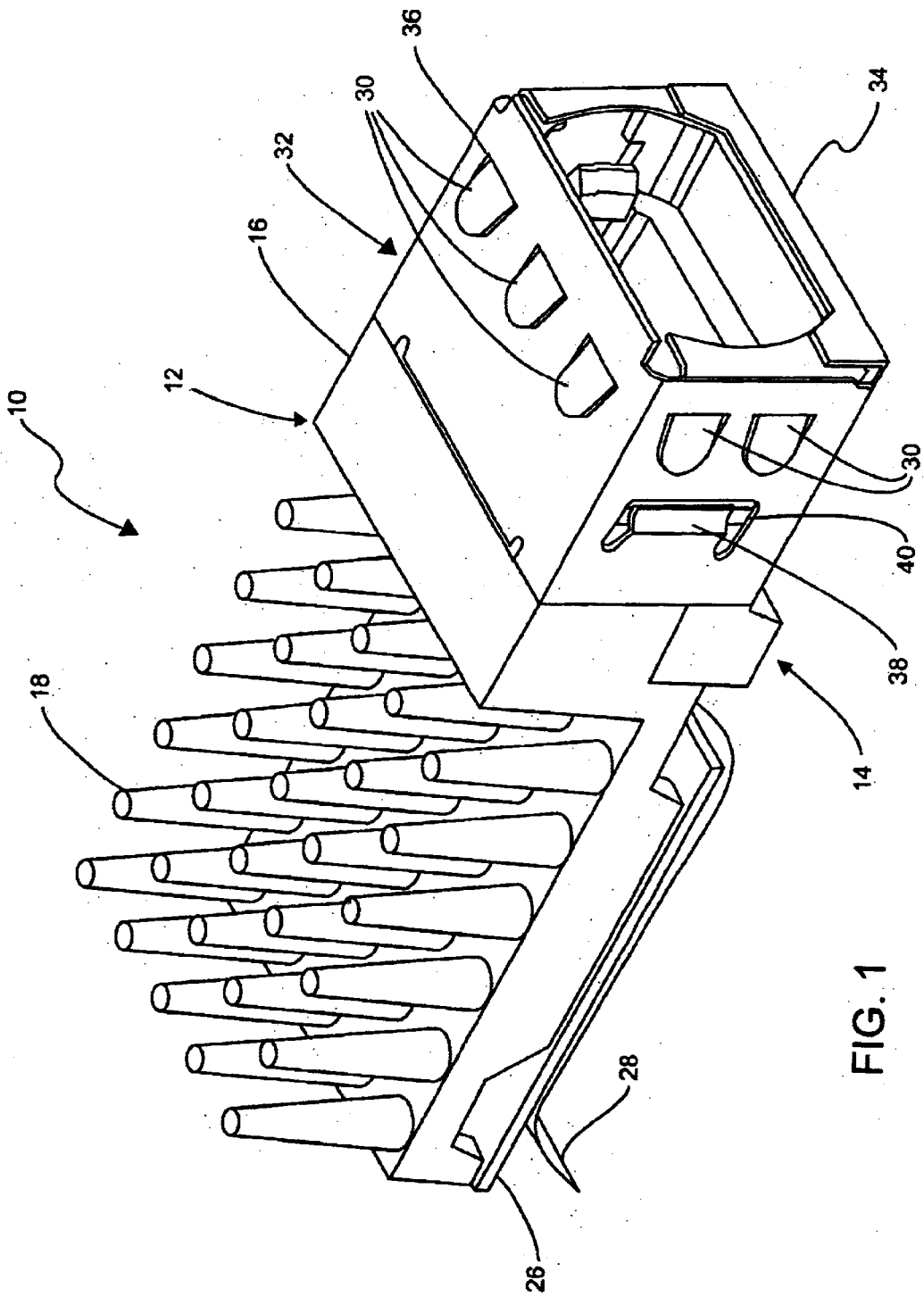
FIG. 1 is a perspective view showing an optical link module according to the present invention including an external shield.
Figure 2:
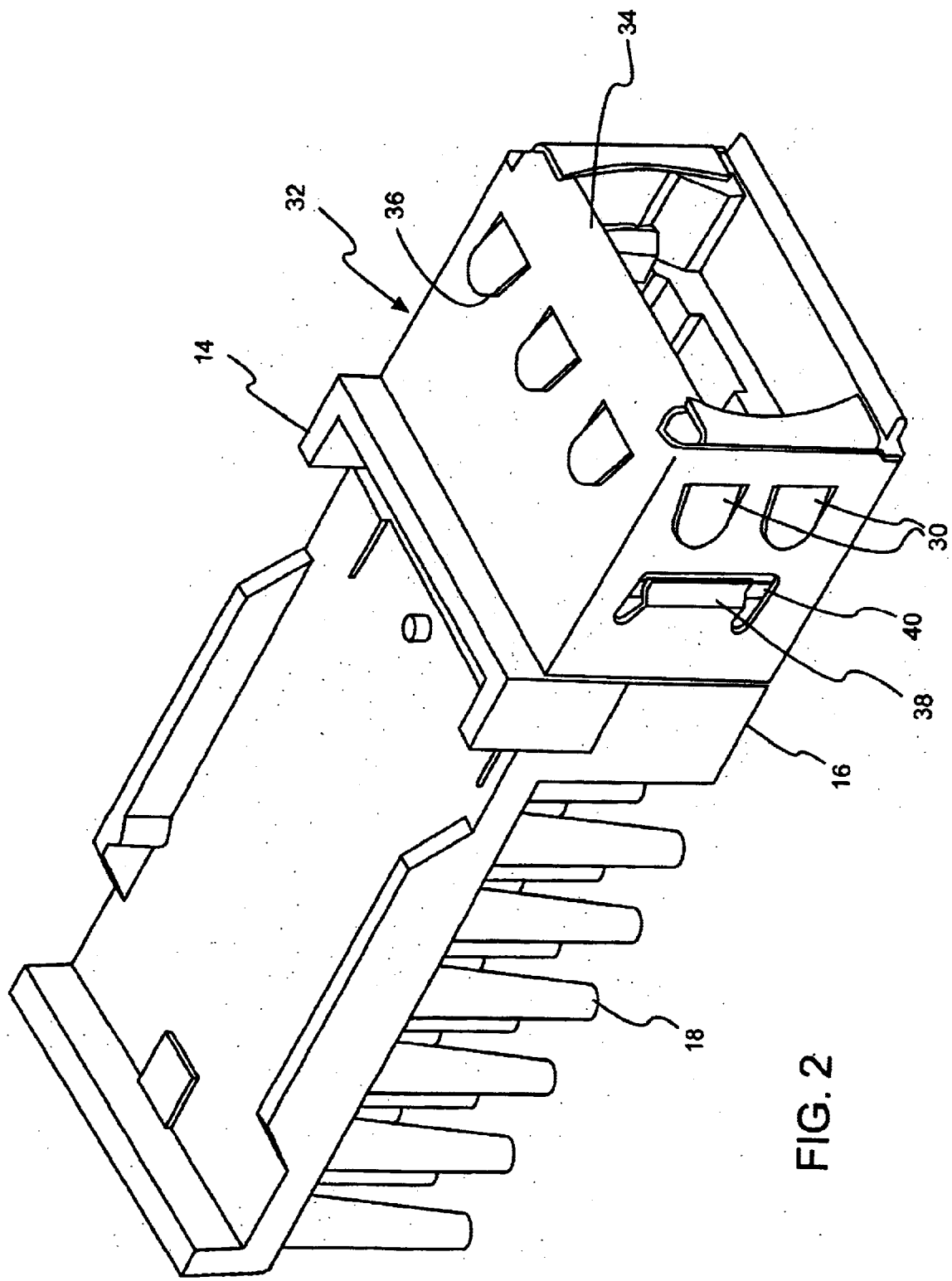
FIG. 2 is a perspective view of the underside of the optical link module shown without a stiffener and flexible circuit.

FIGS. 1 and 2 show the general configuration of an exemplary optical link module 10. Optical link module 10 represents a fiber optic communications package which is mounted within a component such as a router that transfers data to and from another component of the router or other computer systems such as network servers, mid-range computers, mainframe computers, work stations, desktop computers, portable computers, and the like.

The optical link module 10 generally includes an upper portion 12 and a lower portion 14. The upper portion 12 is preferably die cast as a single piece, and includes an upper connector 16 and a heat sink 18. The lower portion 14 of the module 10 is also preferably die cast from a relatively high thermal conductivity material such as aluminum. Together, the upper connector 16 and the lower portion 14 form a female part of a standard MTP or MTO connector adapted to receive a male part situated on the distal end of a fiber optic cable. In a preferred embodiment, the male end of the fiber includes a multiple array similar to that shown in U.S. Pat. No. 5,499,311, the disclosure of which is hereby incorporated by reference.

An aluminum stiffener 26 is provided on the underside of the heat sink 18, ith a flexible circuit 28 attached thereto. The flexible circuit may carry integrated circuit chips, resistors and other structure which operate to convert and route the fiber optic light signals from the fiber to and from other areas of the router of which the module 10 is a part. Although the details of such conversion and routing are considered to be well within the level of ordinary skill in the art, further information is available in U.S. Pat. No. 6,085,006, the disclosure of which is hereby incorporated by reference. Normally, the module 10 receives serial electrical signals from a CPU, and an emitter (which may be an LED or laser) converts the serial electrical signal to a serial optical signal for transmission through the optical fiber. The module may also receive parallel electrical signals from the CPU, and convert the parallel electrical signal to a serial electrical signal that is provided to the emitter. The emitter in turn converts the serial electrical signal to a serial optical signal for transmission through the fiber. Similarly, incoming serial optical signals are converted by a receiver (which may be a photodiode) to a serial electrical signal. The serial electrical signal may be output to the CPU as a serial signal or converted to a parallel electrical signal and transmitted to the CPU. The emitter and the receiver may also transmit a parallel signal, in which case it is possible to omit the parallel to serial conversion or it may be possible to convert a serial electrical signal to a parallel signal for parallel optical transmission. In a preferred embodiment, signals are transmitted over the optical fibers at a frequency of about 2.5 gigahertz.

The upper connector 16 and the lower portion 14 are provided with backwardly projecting tabs 30. An external EMI shield 32 is also provided having a front lip 34 and a series of cutouts 36. The external shield 32 is slidably received over the unit 10 until detent features 38 on each side of the shield snap into grooves 40 in the sides of the connector housing and lock the EMI shield in position. The front lip 34 prevents any significant travel of the EMI shield 32 further on to the unit 10, while cooperation of the tabs 30 extending into the corresponding cutouts 36 prevents the shield from coming off of the unit.

The EMI shield 32 holds together the two halves 14 and 16 of the connector housing without the use of any additional fasteners, adhesives, or other normal fastening devices. After the external shield 32 is applied, the male end of the connector may be inserted. If any problem with the module 10 is noted during manufacturing, the EMI shield 32 can be removed and the module can be easily disassembled for rework of the parts.

The shield 32 is preferably fabricated from a thin sheet of a metal possessing good EMI characteristics. Suitable materials for the shield 32 include gold, silver, and what is known in the art as nickel silver which is 59 percent by weight copper, 12 percent by weight nickel, and 29 percent by weight zinc. Sheets on the order of about 0.2 mm in thickness provide suitable EMI characteristics. The EMI shield 32 provides a barrier to any escaping EMI radiation.

To facilitate this end, the shield 32 is grounded to the upper connector 16, and thus to the heat sink 18. Because the heat sink 18 is in turn electrically grounded, either logically or to a chassis, the EMI energy isdissipated.

The present invention thus provides a relatively simple, low cost method of achieving EMI suppression for the optical device, while at the same time allowing accessibility and removability of the fiber optic connector and cable. It should be appreciated that the optical link module is suitable for use in other communications systems or optical transmission networks, such as those used in telephone service. Various other modifications may be made to the illustrated embodiments without departing from the spirit and scope of the invention. Therefore, the invention lies solely in the claims hereinafter appended.

What is claimed is:

1. An optical fiber link module, comprising:

an optical fiber;

an upper portion and a lower portion adapted to receive the optical fiber, the upper and lower portion including at least one groove therein and at least one tab extending therefrom;

an electromagnetic interference shield enclosing the upper and lower portions, the electromagnetic interference shield having a detent and at least one cutout, the detent engaging the at least one groove and the at least one cutout cooperating with the at least one tab.

2. The optical fiber link module of claim 1 wherein the shield comprises a sheet of a metallic material.

3. The optical fiber link module of claim 2 wherein the metallic material is selected from the group consisting of gold, silver, copper, zinc and nickel or alloys thereof.

4. The optical fiber link module of claim 1 wherein the upper portion comprises an upper connector and a heat sink.

5. The optical fiber link module of claim 1 wherein the shield includes a front lip.

6. The optical fiber link module of claim 1 wherein the upper portion and the lower portion form an MTP connector.

7. The optical fiber link module of claim 1 wherein the upper portion and the lower portion form an MTO connector.

8. The optical fiber link module of claim 1 wherein the upper portion comprises aluminum.

9. The optical fiber link module of claim 1 wherein the lower portion comprises aluminum.

10. An optical fiber link module, comprising:

an optical fiber;

an upper portion and a lower portion adapted to receive the optical fiber, the upper and lower portion including at least one groove therein and at least one tab extending therefrom;

an electromagnetic interference shield disposed around the upper and lower portions, the electromagnetic interference shield having a detent and at least one cutout, the detent engaging the at least one groove and the at least one cutout cooperating with the at least one tab, the electromagnetic interference shield comprising a metallic material.

11. The optical fiber link module of claim 10 wherein the electromagnetic interference shield comprises a sheet of metallic material.

12. The optical fiber link module of claim 10 wherein the metallic material is selected from the group consisting of gold, silver, copper, zinc and nickel or alloys thereof.

13. The optical fiber link module of claim 10 wherein the upper portion comprises an upper connector and a heat sink.

14. The optical fiber link module of claim 10 wherein the shield includes a front lip.

15. The optical fiber link module of claim 10 wherein the upper portion and the lower portion form an MTP connector.

16. The optical fiber link module of claim 10 wherein the upper portion and the lower portion form an MTO connector.

17. The optical fiber link module of claim 10 wherein the upper portion comprises aluminum.

18. The optical fiber link module of claim 10 wherein the lower portion comprises aluminum.

19. An optical fiber link module, comprising:
an optical fiber;
an upper portion and a lower portion adapted to receive the optical fiber, the upper and lower portion including at least one groove therein and at least one tab extending therefrom;
a metallic electromagnetic interference shield disposed around the upper portion and the lower portion to hold the upper and lower portionstogether, the shield having a detent and at least one cutout, the detent engaging the at least one groove and the at least one cutout cooperating with the at least one tab.

* * * * *